Aug. 30, 1932.  E. J. HAMBRECHT  1,874,973
CANDY CONDITIONING APPARATUS
Filed Nov. 23, 1931   3 Sheets-Sheet 1

Aug. 30, 1932.  E. J. HAMBRECHT  1,874,973
CANDY CONDITIONING APPARATUS
Filed Nov. 23, 1931   3 Sheets-Sheet 3

INVENTOR
Edward J. Hambrecht,
BY
ATTORNEYS

Patented Aug. 30, 1932

1,874,973

UNITED STATES PATENT OFFICE

EDWARD J. HAMBRECHT, OF PALATINE BRIDGE, NEW YORK, ASSIGNOR TO BEECH-NUT PACKING COMPANY, OF CANAJOHARIE, NEW YORK, A CORPORATION OF NEW YORK

CANDY CONDITIONING APPARATUS

Application filed November 23, 1931. Serial No. 576,784.

In the manufacture of hard candies such as fruit drops which are in the form of circular disks, the candy is spun into strip form and is then fed between suitably shaped rolls of a candy forming machine which finally shape the strip and present it to a cutting-off wheel which cuts off pieces therefrom, and suitable dies of the machine operate to shape the pieces into the disk candies. Heretofore it has been customary for the operator to present the spun candy strip by hand directly to the forming rolls of the machine. It has been found, however, when the spun strip is thus presented to the forming rolls that owing to variations in the size of the strip and the rate of the feed, the pieces cut off are likely to vary in size, and consequently owing to the construction of the forming dies, the resulting disk candies are likely to be of varying thicknesses. Also, by thus presenting the spun strip to the forming rolls and dies, checking and cracking of the surfaces of the completed pieces is likely to occur, this condition being usually caused by unavoidable chilling of the outer surface of the strip as it is delivered by hand to the forming rolls.

One of the objects of the present invention is to provide an apparatus for presenting the candy to the forming rolls of a candy forming machine of the character indicated, whereby the disadvantages of the method, above described, are overcome and uniform results are insured.

Figure 1:
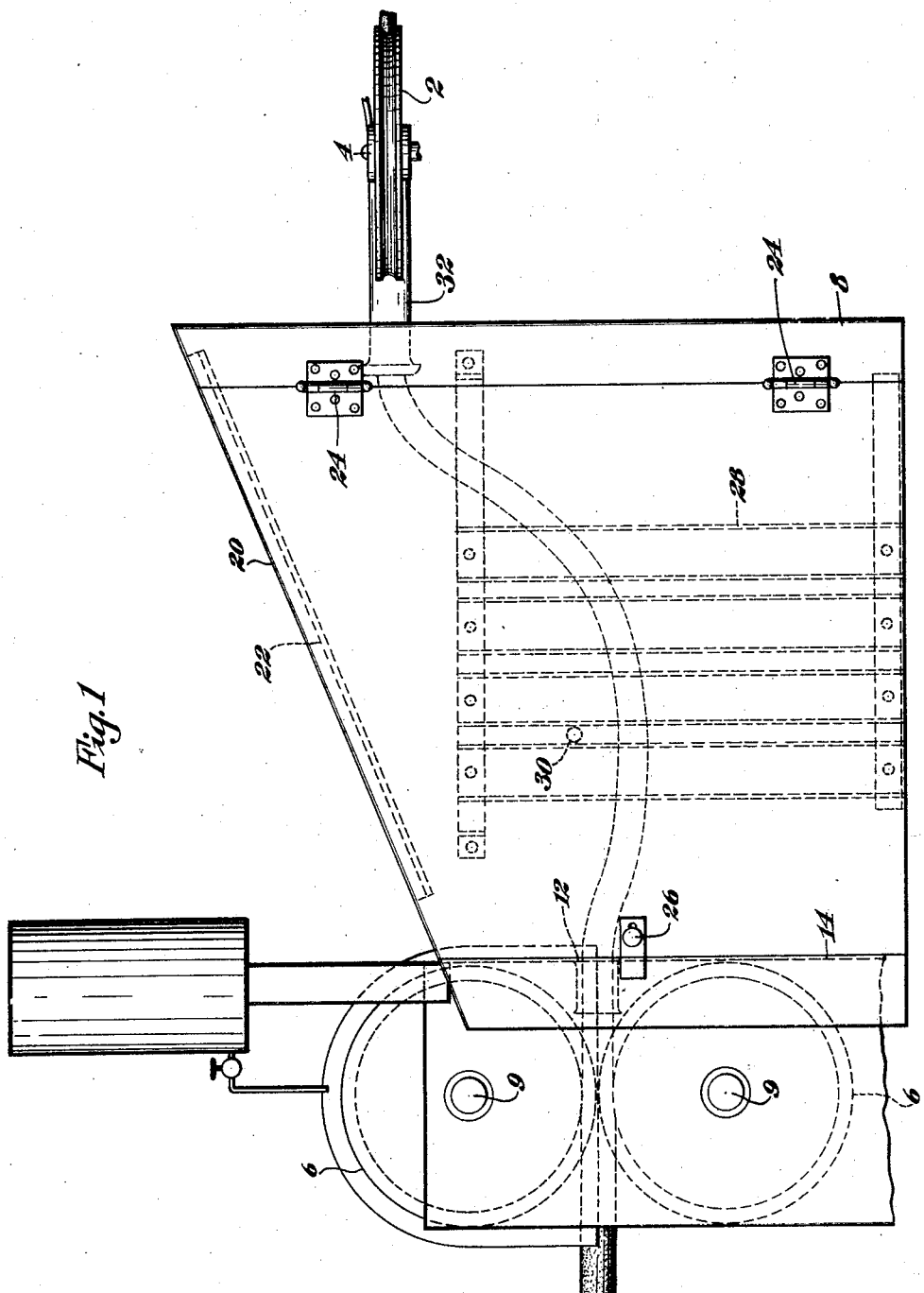
Figure 2:
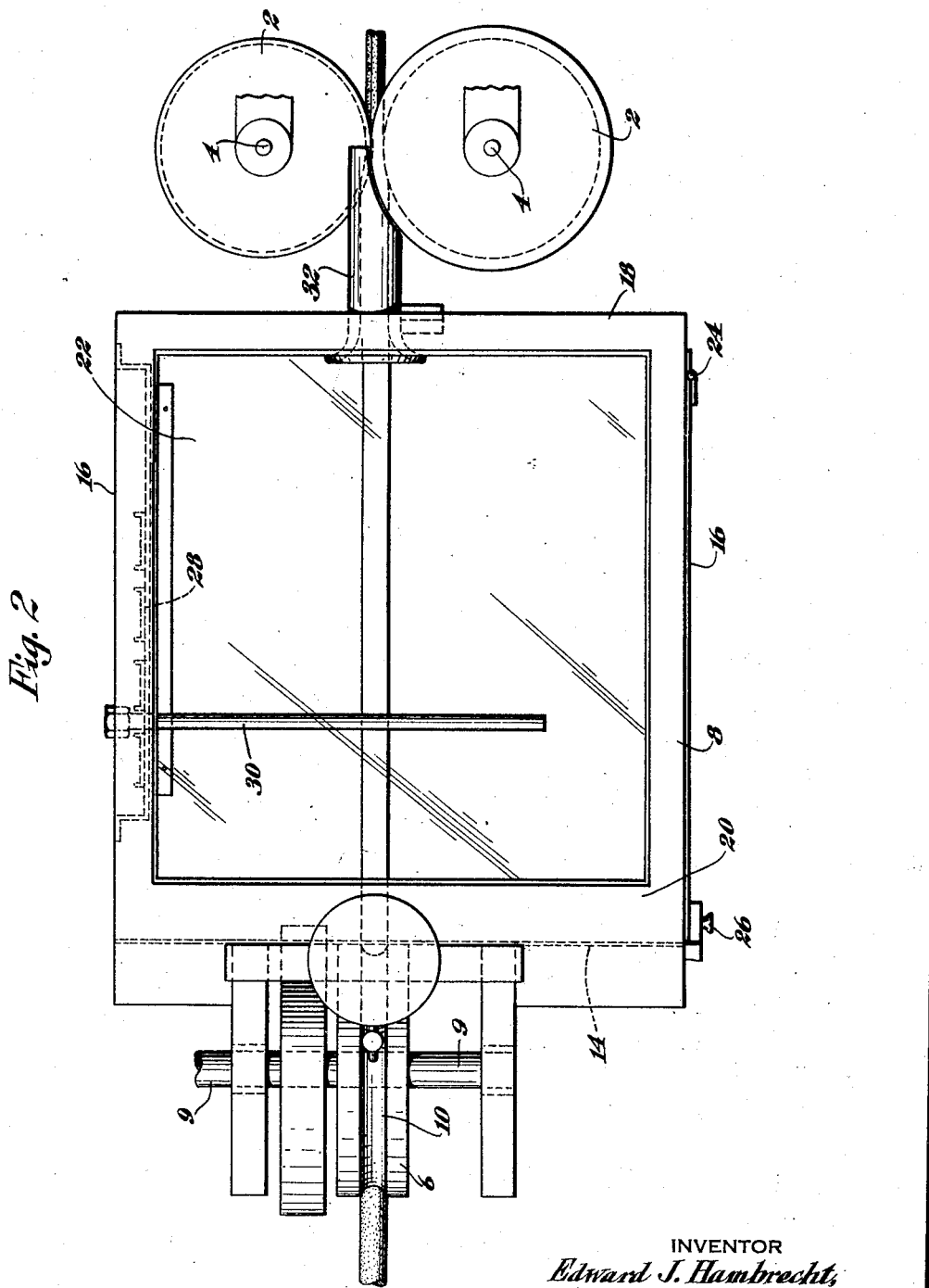
Figure 3:
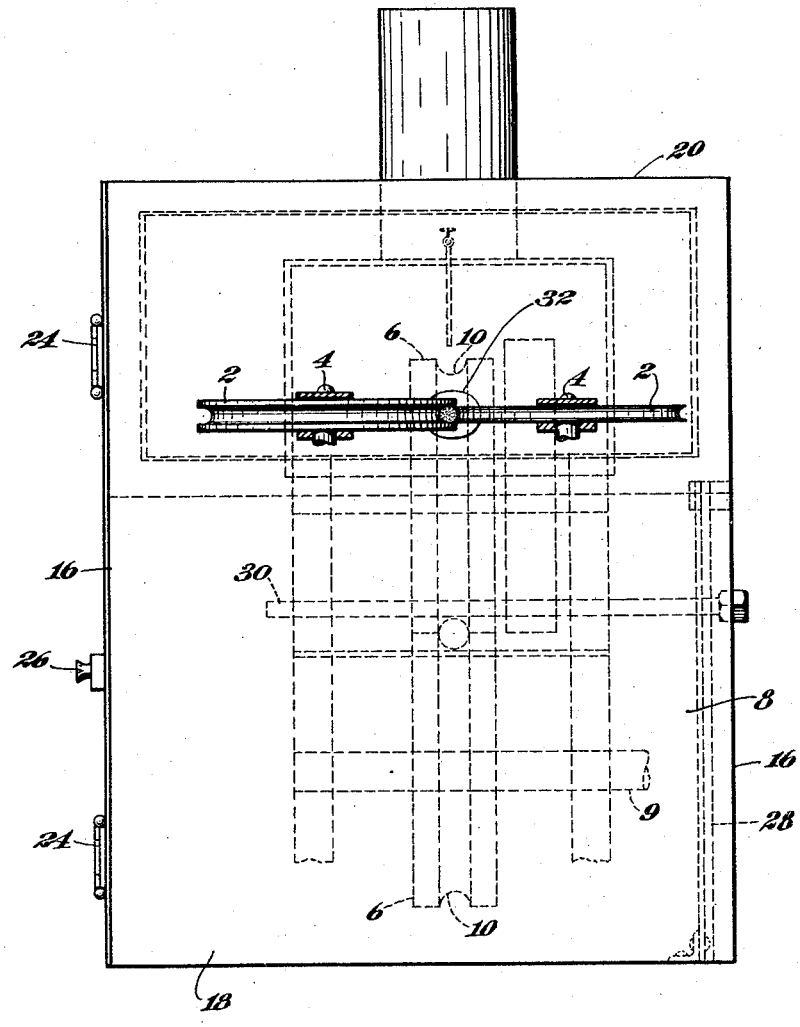

The several features of the invention, whereby this and other objects may be attained, will be readily understood from the following description and accompanying drawings, in which, Figure 1 is a side view of an apparatus embodying the features of my invention in their preferred form; and Figs. 2 and 3 are plan and end elevations of the same.

The apparatus illustrated in the drawings is shown in association with forming wheels 2 of a candy forming machine having the usual cutting-off wheel for receiving the strip of candy from the forming rolls, and dies for shaping the candy into circular disks. Other than the forming rolls 2, the parts of the candy forming machine which are of a well known construction, are not shown in the drawings. The forming rolls 2 are, as customary, carried by shafts 4 that are arranged vertically and suitably driven from the driving shaft of the candy forming machine. Heretofore, it has been customary to guide the spun candy by hand directly to the forming rolls.

In accordance with the present invention the spun candy, before passing to the forming rolls 2, passes between sizing rolls 6 and through a heating chamber 8. The sizing rolls 6 are carried by driven shafts 9 which are horizontally arranged. These sizing rolls are provided with registering substantially semicircular grooves 10. The spun candy is presented by hand to the sizing rolls and the registering grooves shape the strip into cylindrical form. From the sizing rolls the candy passes through an opening 12 in the front wall 14 of the heating chamber 8. This heating chamber, in addition to the front wall 14, is provided with side walls 16, rear end wall 18, and a top wall 20, which is provided with a transparent window 22 extending over a substantial portion thereof. One of the side walls 16 is hinged at 24 so as to permit it to be swung open to allow access to the interior of the heating chamber, the wall or door being held closed by a latch 26. On the opposite side wall of the heating chamber, there is mounted an electric heating element 28 for heating the interior of the chamber, the temperature of the chamber being maintained at from one hundred and forty degrees to one hundred and eighty degrees Fahrenheit.

A rod 30 is secured to one side wall of the heating chamber and projects horizontally transversely of the chamber, slightly above the level of said opening 12 in the front wall of the chamber.

A tubular guide 32 extends through an opening in the rear end wall 18 of the heating chamber. This guide 32 is spaced a distance above the opening 12 in the front wall, and its outer end is suitably positioned to guide the spun candy to the forming rolls 2.

The cylindrical strip as it passes from the sizing rolls 6 and through the opening 12 in the front wall, passes beneath the horizontal rod 30 and then through the tubular guide 32 to the forming rolls 2. As the strip passes through the heating chamber from said opening 12 in the front wall to the tubular guide 32, the feed is such that slack is provided between these two points, as indicated in Fig. 1. The rod 30 is so located that so long as the strip is spaced a distance below the rod the required slack is provided in the strip as will be apparent from the drawings. This slack in the strip insures that the forming rolls 2 will uniformly feed the strip, and thus insures that the strip will be uniformly presented to the forming rolls. As the strip is made into cylindrical form by the sizing rolls 6, the forming rolls 2 merely feed the strip and serve to flatten the sides thereof so as to properly shape the strip to present it to the cutting-off wheel of the forming machine.

With this construction it will be apparent that the spun strip as it emerges from the sizing rolls 6 is shaped uniformly into cylindrical form, and that as it passes from the sizing rolls through the heating chamber and through the tubular guide 32 to the forming rolls, it is maintained at such a temperature as to maintain the candy in proper soft condition to be acted upon by the forming dies of the forming machine. The candy is thus maintained at a more or less uniform temperature throughout its thickness so that there is no chilling of its outer surface which would cause the completed candies when cooled to have checkered or cracked surfaces. Thus, my improved apparatus is capable of presenting spun candy in proper form and condition to the candy-forming machine, so that such machine may cut off pieces from the strip and form them into the desired shape under the most satisfactory conditions.

As will be evident to those skilled in the art, my invention permits various modifications without departing from the spirit thereof or the scope of the appended claims.

What I claim is:

1. In an apparatus for presenting spun candy to a forming machine of the class described, the combination of sizing rolls between which the strip of spun candy passes which shapes the strip into substantially cylindrical form, forming rolls spaced a distance at the rear of the sizing rolls for flattening the opposed sides of the cylindrical strip of candy, and a heating chamber interposed between the sizing and forming rolls through which the strip passes with slack provided between points adjacent the front and rear walls of said chamber.

2. In a apparatus for presenting spun candy to a forming machine of the class described, the combination of sizing rolls between which the strip of spun candy passes, forming rolls spaced a distance at the rear of the sizing rolls, and a heating chamber interposed between the sizing and forming rolls for maintaining the strip of candy at a predetermined temperature as it passes from one set of rolls to the other.

3. In an apparatus for presenting spun candy to a forming machine of the class described, the combination of sizing rolls having their axes horizontally arranged which shape the candy into substantially cylindrical form, forming rolls spaced a distance at the rear of the sizing rolls having their axes arranged substantially vertical for flattening the opposed sides of the cylindrical strip of candy, and a heating chamber interposed between the sizing and forming rolls through which the candy passes so as to maintain the candy at a predetermined temperature during its travel from the sizing rolls to the forming rolls.

In testimony whereof, I have signed my name to this specification.

EDWARD J. HAMBRECHT.